United States Patent [19]

Nakayama et al.

[11] 4,410,694
[45] Oct. 18, 1983

[54] PROCESS FOR PRODUCING FIBROUS CARBOXYMETHYL CELLULOSE

[75] Inventors: Mutsuo Nakayama; Hiromi Yamaguchi; Harumasa Yamasaki, all of Wakayama, Japan

[73] Assignee: Kao Soap Co., Ltd., Tokyo, Japan

[21] Appl. No.: 354,856

[22] Filed: Mar. 4, 1982

[30] Foreign Application Priority Data

Mar. 18, 1981 [JP] Japan .................................. 56/38861

[51] Int. Cl.$^3$ .............................................. C08B 11/00
[52] U.S. Cl. ...................................... 536/98; 8/155.1
[58] Field of Search ...................... 536/97, 98; 68/189; 8/155.1

[56] References Cited

U.S. PATENT DOCUMENTS

| 846,462 | 3/1907 | Fontaine | 68/189 |
|---|---|---|---|
| 1,727,041 | 9/1929 | Ryley | 8/155.1 |
| 3,650,676 | 3/1972 | Bergholtz | 8/155.1 |
| 3,678,031 | 7/1972 | Schoggen | 536/98 |
| 3,695,827 | 10/1972 | Byrd | 68/189 |
| 3,909,195 | 9/1975 | Machell et al. | 8/120 |
| 3,927,972 | 12/1975 | Kawamura et al. | 68/187 |
| 3,967,923 | 7/1976 | Ameling | 8/155.1 |
| 4,063,018 | 12/1977 | Ohnaka et al. | 536/98 |
| 4,206,619 | 6/1980 | Fukuroi et al. | 68/189 |
| 4,250,306 | 2/1981 | Lask et al. | 536/98 |

FOREIGN PATENT DOCUMENTS 2027714 2/1980 United Kingdom ................. 536/98

Primary Examiner—Ronald W. Griffin
Attorney, Agent, or Firm—Flynn, Thiel, Boutell & Tanis

[57] ABSTRACT

Carboxymethyl cellulose fibers are manufactured by reacting a starting cellulose with an alkaline solution containing an etherifying agent dissolved therein while the cellulose is filled in a reactor and the solution is circulating by a pump so as to come into continuous contact with the cellulose.

11 Claims, 2 Drawing Figures

PROCESS FOR PRODUCING FIBROUS CARBOXYMETHYL CELLULOSE

The present invention relates to a process for producing carboxymethyl cellulose fiber having an arbitrary, uniform degree of substitution from natural cellulose fiber or regenerated cellulose fiber.

A swellable cellulose ether, particularly carboxymethyl cellulose, has superior characteristics as an absorbent for physiological liquids such as urine, blood, and sweat. As an absorbent for physiological liquids, it is finding a variety of applications in many areas, and is acquiring greater importance. As for its production, there have been proposed a variety of processes.

However, the conventional processes have many drawbacks. As far as an industrial manufacturing process is concerned, the process disclosed in Japanese Patent Laid-open No. 54-163981 (1979) is the only one known to date. At present it is still hard to say that other processes are satisfactory.

Accordingly, in an attempt to establish an industrial process for producing carboxymethyl cellulose having an arbitrary, uniform degree of substitution, we made a series of studies on the solvent and reaction system.

The problems encountered in the studies were that the cellulose is handled in the form of fiber or thread and therefore cannot be crushed and stirred, the surface area of cellulose contributing to the reaction is small, the hydrolytic reaction concomitant with the reaction of an etherifying agent with cellulose makes the usage of the etherifying agent less effective, and making the reaction uniform is very difficult.

Thus, we devised a liquid circulation system for the reaction system after trial of various solvents which were considered to be adequate, and carried out the carboxymethylation of cellulose fiber using the circulation system. After reviewing the results from the standpoint of making the reaction uniform and the efficiency of the etherifying agent, it was found that the efficiency of etherifying agent is increased and the reaction is readily made uniform if a homogeneous solution of an alkaline reaction mixture is brought by circulation into contact with cellulose fiber or regenerated cellulose fiber filled in a vessel equipped with a pump circulating system. The present invention has been completed based on these findings.

In this invention, the etherifying agent preferably used, among others, is monochloroacetic acid or its salt. The flow rate of circulation of the alkaline reaction mixture should preferably be greater than 10 l/min per 1 Kg of cellulose from the standpoint of keeping the reaction uniform.

The alkaline homogeneous solvent used in this invention means any solvent which dissolves homogeneously an alkaline substance, such as sodium hydroxide or potassium hydroxide, and preferable ones are ethanol-containing solvents. Among others, an aqueous solution of ethanol is preferred. The composition of an aqueous solution of ethanol to be used should preferably be about 80% by weight of ethanol, but concentrations of ethanol in the range from 60% to 90% are satisfactory. The quantity of solvent to be used should preferably be as little as possible for the unit weight of cellulose fiber from the standpoint of efficiency of etherifying agent, but is not specifically limited.

Figure 1:
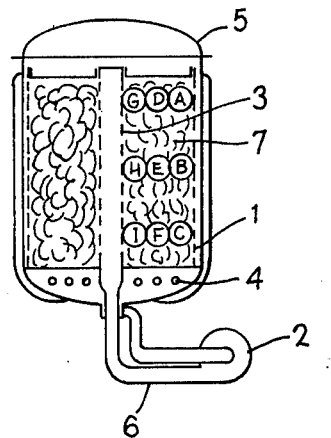
FIG. 1 and FIG. 2 are sectional views, each showing an example of the manufacturing apparatus used for the process of this invention.

In the drawings, the reference numerals identify the following parts:

1 ... Porous cylindrical container
2 ... Circulation pump
3 ... Porous shaft
4 ... Coil
5 ... Lid
6 ... Circulation pipe
7, 9 ... Cellulose fiber
8 ... Porous cylinder One embodiment of the invention will be described with reference to the drawings.

Figure 2:
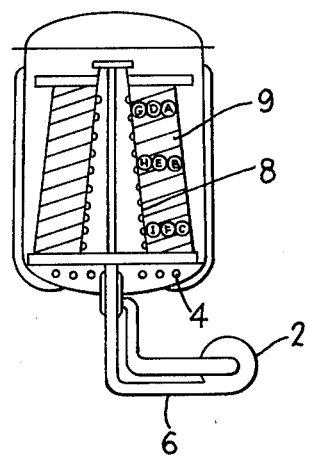

As shown in FIG. 1, a porous cylindrical wall or container 1 is filled with cellulose fiber 7, and into the container 1 is introduces an aqueous ethanol solution in which are dissolved monochloroacetic acid and sodium hydroxide. The reaction solution is brought into contact with the cellulose fiber by circulation from inside to outside or from outside to inside through the holes on the porous shaft 3 by the circulating pump 2. If the cellulose fiber is in the form of thread, the cellulose fiber 9 is wound on porous cylinders 8 as if it were wound on spools and the cylinders are placed in the vessel, as shown in FIG. 2. The reaction solution is brought into contact with the cellulose fiber by circulation from inside to outside or from outside to inside through the holes on the cylinder 8.

The reaction temperature is controlled by heating or cooling the coil 4. So long as the reaction temperature is lower than the boiling point of the solvent, higher reaction temperatures are more advantageous from the standpoint of reaction rate and efficiency of monochloroacetic acid, but lower reaction temperatures are more advantageous from the standpoint of the uniformity of reaction. When this is taken into consideration, 60° to 70° C. is preferable, and the neighborhood of 65° C. is most preferable, although there is no particular limit.

Keeping low the flow rate of circulation of the reaction solution is economically advantageous, but for uniform reaction it should preferably be greater than 10 l/min per 1 Kg of cellulose fiber.

The ethanol to be used may contain a small quantity of a modifier unless it interferes with the reaction. The quantities of sodium hydroxide and monochloroacetic acid to be dissolved in the reaction solution are determined according to the degree of substitution of carboxymethyl cellulose required. When the amounts added exceed their solubility in the aqueous ethanol solution, sodium monochloroacetate crystallizes, which is unfavorable from the standpoint of efficiency of use of monochloroacetic acid and uniform reaction.

It is also possible to cause a crosslinking reaction to take place by adding a small quantity of crosslinking agent when carboxymethylation is carried out.

After the reaction is complete, neutralization is performed with an acid as required and the reaction solution is drained. Washing with an aqueous ethanol solution is carried out several times to remove the by-product salt contained in the fiber. On drying, carboxymethyl cellulose fiber is obtained.

The advantages of the process of this invention are listed below.

According to the process of this invention, an alkalization reaction and an etherification reaction are performed simultaneously in one step. Thus, it is possible not only to shorten the time required for reaction, but also to simplify the process to a great extent.

Using an alkaline homogeneous solvent as the solvent makes the reaction system a solid-liquid two-phase system. High-speed circulation of the reaction solution distributes the reactants to all of the cellulose fibers. Thus, it is possible to carry out the reaction uniformly. In addition, the etherifying agent is used effectively and by-product salt produced is small in quantity.

If a solvent containing a large quantity of water is used, the fiber becomes absorptive as the carboxymethylation proceeds and the fiber swells, causing a problem in the process. Such a problem, however, does not occur in the process of this invention in which an organic solvent is used.

By inverting the direction of circulation, it is possible to carry out etherification uniformly to an extreme extent.

Etherification of cellulose in large quantities is possible by arranging two or more apparatuses of this invention in series or parallel.

By building a coil or heat exchanger into the reaction liquid circulation line, it is possible to control easily the temperature in the system.

According to the process of this invention, it is possible to perform drying by circulating hot air after washing and draining. It is also possible to carry out a series of steps of etherification, washing, and drying in one apparatus. Thus, the process is simplified to an extreme extent.

Since the reaction system is uniform, it is not necessary to crush and stir cellulose raw material. Therefore, the shape of the raw material is not damaged.

As mentioned above, according to the process of this invention, it is possible to produce efficiently carboxymethyl cellulose fiber of stable quality having an arbitrary, uniform degree of etherification from cellulose fiber.

According to the invention, the following reaction apparatus is preferably used. The reaction apparatus comprises a vessel, a circulating pump and circulating pipes connecting said vessel and said pump. The vessel contains therein a container having a peripheral, outer, vertical wall having many openings through which the reaction solution may pass from the outside to the inside, or from the inside to the outside. The container further has a cylindrical tube along the vertical axis of the container. The cylindrical tube has a peripheral wall portion thereof equipped with a plurality of small openings through which the reaction solution may pass in a desired direction. The starting cellulose fibers or strings may be placed between the inner wall of the cylindrical tube and the outer wall of the container. The pipes connected with the pump at its inlet and outlet, respectively, are connected to the inside of the cylindrical tube and with a portion between the outer wall of the container and the inner wall of the vessel, respectively.

A reactor of another type where the starting cellulose is piled therein and the reaction solution can pass uniformly through the piled cellulose may be of course used in the invention. For example, the reactor can have two partition plates having openings therein, whereby the thin central portion is charged with the starting cellulose and the reaction solution is passed from one end portion to the other end portion while passing through the central portion thereby contacting the starting cellulose placed therein.

The invention is illustrated concretely by the following examples.

EXAMPLE 1

As shown in FIG. 1, a porous cylindrical container 1 in a cylindrical vessel, about 23 cm in inside diameter and about 30 cm in height, was filled with about 900 g of polynosic rayon staple and then set as shown in the figure. From the top of the reactor was supplied an alkaline reactant mixture consisting of about 9000 g of 80 wt % aqueous ethanol solution and about 360 g of monochloroacetic acid and 342 g of sodium hydroxide dissolved therein. The mixture was circulated through the circulation pump 2 and circulation pipe 6.

During the reaction, the temperature was kept at 65 ±1° C., and the reaction took about 6 hours to complete. After completion of reaction, the reaction liquid was neutralized and drained, and washing with an aqueous ethanol solution was carried out twice and the reaction product was dried. Thus carboxymethyl cellulose fiber was obtained. The degree of substitution was determined according to nitric acid-methanol method. To verify the uniformity, the degree of etherification was determined at nine points of A to I as shown in FIG. 1, and from the average value of the nine measurements the efficiency of monochloroacetic acid was obtained. The measurements of the degree of substitution obtained when the flow rate of circulation was varied under the above-mentioned reaction conditions are shown in Table 1.

TABLE 1

| Flow rate of circulation | Degree of substitution | | | Efficiency of monochloroacetic acid |
|---|---|---|---|---|
| 5 (l/min) | A 0.33 | B 0.36 | C 0.34 | 46% |
|  | D 0.32 | E 0.32 | F 0.33 |  |
|  | G 0.29 | H 0.32 | I 0.30 |  |
| 18 (l/min) | A 0.36 | B 0.36 | C 0.37 | 53% |
|  | D 0.37 | E 0.36 | F 0.37 |  |
|  | G 0.37 | H 0.36 | I 0.36 |  |
| 36 (l/min) | A 0.39 | B 0.39 | C 0.38 | 57% |
|  | D 0.39 | E 0.39 | F 0.39 |  |
|  | G 0.38 | H 0.39 | I 0.39 |  |

EXAMPLE 2

As shown in FIG. 2, in a cylindrical vessel about 13 cm in inside diameter and about 18 cm in height, was placed about 500 g of cotton thread wound on a porous cylinder 8 like spooled thread. From the reactor inlet was supplied an alkaline reactant mixture consisting of about 4200 g of 80 wt % aqueous ethanol solution and about 200 g of monochloroacetic acid and 190 g of sodium hydroxide dissolved therein. The mixture was circulated through the circulation pump 2 and circulation pipe 6.

During the reaction, the temperature was kept at 65 ±1° C., and the reaction took about 6 hours to complete. After completion of reaction, the reaction liquid was neutralized and drained, and washing with an aqueous ethanol solution was carried out twice and the reaction product was dried. Thus, carboxymethyl cellulose fiber was obtained. The degree of substitution was determined according to the nitric acid-methanol method. To verify the uniformity, the degree of etherification was determined at nine points of A to I as shown in the figure, and from the average value of these measurements the efficiency of monochloroacetic acid was obtained. The measurements of the degree of etherification obtained when the flow rate of circulation was varied under the above-mentioned reaction conditions are shown in Table 2.

TABLE 2

| Flow rate of circulation | Degree of substitution | | | Efficiency of monochloroacetic acid |
|---|---|---|---|---|
| 5 (l/min) | A 0.31 | B 0.28 | C 0.30 | 42% |
|  | D 0.33 | E 0.31 | F 0.29 |  |
|  | G 0.29 | H 0.26 | I 0.28 |  |
| 10 (l/min) | A 0.32 | B 0.32 | C 0.32 | 47% |
|  | D 0.32 | E 0.33 | F 0.32 |  |
|  | G 0.32 | H 0.32 | I 0.31 |  |
| 20 (l/min) | A 0.33 | B 0.34 | C 0.34 | 49% |
|  | D 0.34 | E 0.34 | F 0.34 |  |
|  | G 0.34 | H 0.34 | I 0.34 |  |

COMPARATIVE EXAMPLE 1

An experiment was carried out using the same apparatus, reaction conditions, and charging composition as in Example 2, except that pure water was used as a solvent in place of the aqueous ethanol solution. The measurements of the degree of substitution are shown in Table 3.

TABLE 3

| Flow rate of circulation | Degree of substitution | | | Efficiency of monochloroacetic acid |
|---|---|---|---|---|
| 10 (l/min) | A 0.03 | B 0.03 | C 0.04 | 4.0% |
|  | D 0.03 | E 0.03 | F 0.03 |  |
|  | G 0.03 | H 0.04 | I 0.03 |  |

COMPARATIVE EXAMPLE 2

An experiment was carried out using the same apparatus, reaction conditions, and charging composition as in Example 2, except that 87 wt % aqueous isopropanol solution was used as a solvent in place of the aqueous ethanol solution. The measurements of the degree of substitution are shown in Table 4.

TABLE 4

| Flow rate of circulation | Degree of substitution | | | Efficiency of monochloroacetic acid |
|---|---|---|---|---|
| 10 (l/min) | A 0.32 | B 0.32 | C 0.33 | 41% |
|  | D 0.24 | E 0.26 | F 0.26 |  |
|  | G 0.26 | H 0.25 | I 0.27 |  |

The isopropanol solution separates into two layers of water-sodium hydroxide and isopropanol-water-monochloroacetic acid. Therefore, it does not bring about uniform etherification as shown in the above stated data.

The embodiments of the invention in which an exclusive property or privilege is claimed are defined as follows:

1. A process for the preparation of carboxymethyl cellulose fibers comprising continuously circulating a homogeneous alkaline reaction liquid through cellulose fibers packed in a reaction vessel, which cellulose fibers are selected from the group consisting of natural cellulose fibers and regenerated cellulose fibers, at a flow rate of said reaction liquid of greater than 10 l/min per Kg of said cellulose fibers, said reaction liquid comprising an effective amount of an etherifying agent selected from the group consisting of monochloroacetic acid and salts thereof, dissolved in a homogeneous alkaline solvent which consists essentially of ethanol and water, for a period of time sufficient to substantially completely convert said cellulose fibers into said carboxymethyl cellulose fibers.

2. A process according to claim 1, wherein said solvent consists essentially of 60-90% by weight of ethanol and the balance is water.

3. A process as claimed in claim 1, wherein said solvent contains an effective amount of sodium hydroxide dissolved therein to make said solvent alkaline.

4. A process as claimed in claim 2, wherein said solvent consists of about 80% by weight ethanol and the balance is water.

5. A process as claimed in claim 1, wherein said homogeneous reaction liquid is at a temperature in the range of 60° C. to 70° C.

6. A process as claimed in claim 1, further including a step of inverting the direction of circulation of said homogeneous reaction liquid.

7. A process as claimed in claim 1, wherein said step of circulating said homogeneous reaction liquid is carried out such that said cellulose fibers retain their shape as said cellulose fibers are converted into said carboxymethyl cellulose fibers, said cellulose fibers and said carboxymethyl cellulose fibers formed therefrom being free from influences which tend to crush or stir said cellulose fibers and said carboxymethyl cellulose fibers.

8. A process as claimed in claim 1, wherein said cellulose fibers are packed into a porous container and said reaction liquid flows through a porous wall of said container.

9. The process as claimed in claim 1, wherein said cellulose fibers are wound on a porous cylinder and said reaction liquid is circulated through said cylinder and flows radially outwardly therefrom through said cellulose fibers.

10. A process for preparing swellable fibers of an alkali metal salt of carboxymethyl cellulose having a substantially uniform degree of carboxymethyl substitution, which comprises: placing a bed of cellulose fibers selected from the group consisting of natural cellulose fibers and regenerated cellulose fibers, into a vessel so that a reaction liquid can flow through said bed of cellulose fibers from one side of said bed to the opposite side thereof; continuously flowing a reaction liquid through said bed of cellulose fibers from said one side to said opposite side thereof at a flow rate of said reaction liquid of greater than 10 liters per minute, per 1 Kg of said cellulose fibers, under conditions and for a period of time effective to cause said reaction liquid to convert said cellulose fibers to swellable fibers of an alkali metal salt of carboxymethyl cellulose, said reaction liquid consisting essentially of an aqueous solution of ethanol containing dissolved therein an alkali metal hydroxide and an etherifying agent selected from the group consisting of monochloroacetic acid and salts thereof, said aqueous solution of ethanol consisting essentially of from 60 to 90% by weight of ethanol and the balance is essentially water; and then recovering said swellable fibers of an alkali metal salt of carboxymethyl cellulose.

11. A process for the preparation of fibers of sodium carboxymethyl cellulose suitable for use as absorbent fibers, consisting essentially of the steps of:
continuously circulating a homogeneous alkaline reaction liquid through substantially stationary cellulose fibers selected from natural cellulose fibers and regenerated cellulose fibers, said cellulose fibers being packed in a reaction vessel, at a flow rate of said reaction liquid of greater 10 l/min per Kg of said cellulose fibers, said homogeneous alkaline reaction liquid consisting essentially of an amount of an etherifying agent which is monochloroacetic acid or a salt thereof effective as an etherifying agent to etherify said cellulose fibers, an amount of NaOH effective to form sodium carboxymethyl cellulose, and a solvent which consists of 60 to 90% by weight ethanol and the balance is water, said cellulose fibers being free of influences which tend to crush or stir said cellulose fibers, whereby said cellulose fibers are substantially uniformly converted to sodium carboxymethyl cellulose fibers having a selected degree of substitution depending on the amount of said etherifying agent;

then neutralizing said alkaline reaction liquid;

then draining off said neutralized reaction liquid;

then washing said sodium carboxymethyl cellulose fibers to remove by-produced salts contained in said sodium carboxymethyl cellulose fibers; and then drying said sodium carboxymethyl cellulose fibers.

* * * * *

UNITED STATES PATENT AND TRADEMARK OFFICE
CERTIFICATE OF CORRECTION

PATENT NO. : 4 410 694
DATED : October 18, 1983
INVENTOR(S) : Mutsuo Nakayama et al It is certified that error appears in the above-identified patent and that said Letters Patent is hereby corrected as shown below:

Column 7, Line 4; after "greater" insert ---than---.

Signed and Sealed this

Fourteenth Day of February 1984

[SEAL]

Attest:

GERALD J. MOSSINGHOFF

Attesting Officer     Commissioner of Patents and Trademarks